United States Patent
Kayani et al.

(10) Patent No.: US 8,954,183 B2
(45) Date of Patent: Feb. 10, 2015

(54) AIRCRAFT COMPONENT MANUFACTURING METHOD AND APPARATUS

(75) Inventors: Amir Kayani, Bristol (GB); Michael Poad, Bristol (GB)

(73) Assignee: Airbus Operations Limited, Bristol (GB)

(*) Notice: Subject to any disclaimer, the term of this patent is extended or adjusted under 35 U.S.C. 154(b) by 0 days.

(21) Appl. No.: 13/150,693

(22) Filed: Jun. 1, 2011

(65) Prior Publication Data
US 2011/0301741 A1   Dec. 8, 2011

(30) Foreign Application Priority Data
Jun. 2, 2010   (GB) .................................. 1009219.5

(51) Int. Cl.
| G06F 19/00 | (2011.01) |
| G06F 17/00 | (2006.01) |
| G05B 19/04 | (2006.01) |
| B23K 26/08 | (2014.01) |
| B23K 26/03 | (2006.01) |
| B23K 26/04 | (2014.01) |
| B23K 26/36 | (2014.01) |
| B25J 9/16 | (2006.01) |
| B25J 11/00 | (2006.01) |

(52) U.S. Cl.
CPC ............ *B23K 26/0861* (2013.01); *B23K 26/03* (2013.01); *B23K 26/04* (2013.01); *B23K 26/362* (2013.01); *B25J 9/1612* (2013.01); *B25J 11/0055* (2013.01); *G05B 2219/37555* (2013.01); *G05B 2219/37558* (2013.01); *G05B 2219/39517* (2013.01)
USPC .............. 700/114; 701/90; 701/192; 701/253

(58) Field of Classification Search
USPC .......... 901/2, 14, 19, 27, 46, 50; 700/90, 114, 700/192, 213, 253, 258, 259
See application file for complete search history.

(56) References Cited

U.S. PATENT DOCUMENTS

| 6,317,953 | B1 | 11/2001 | Pryor | |
| 2001/0049846 | A1* | 12/2001 | Guzzi et al. | 8/158 |
| 2004/0167647 | A1* | 8/2004 | Ghuman et al. | 700/97 |
| 2006/0151572 | A1* | 7/2006 | Yamaoka et al. | 228/47.1 |
| 2010/0185315 | A1* | 7/2010 | Schmidt et al. | 700/160 |
| 2011/0022216 | A1* | 1/2011 | Andersson | 700/114 |
| 2011/0282483 | A1* | 11/2011 | Simonetti et al. | 700/114 |
| 2011/0282492 | A1* | 11/2011 | Krause et al. | 700/259 |
| 2012/0152911 | A1* | 6/2012 | Diez et al. | 219/117.1 |

FOREIGN PATENT DOCUMENTS

| EP | 1345099 A2 | 9/2003 |
| WO | 2004/026539 A2 | 4/2004 |
| WO | 2008/113783 A2 | 9/2008 |
| WO | 2009/059323 A1 | 5/2009 |

OTHER PUBLICATIONS

UK Search Report for GB1009219.5 dated Sep. 24, 2010.

* cited by examiner

*Primary Examiner* — Darrin Dunn
(74) *Attorney, Agent, or Firm* — Lowe Hauptman & Ham, LLP

(57) ABSTRACT

A method of manufacturing in which a robot arm is used to pick up a workpiece which is subsequently scanned by a scanner and positioned relative to a manufacturing system for manufacturing in order to eliminate the use of a bespoke jig.

15 Claims, 2 Drawing Sheets

AIRCRAFT COMPONENT MANUFACTURING METHOD AND APPARATUS

RELATED APPLICATIONS

The present application is based on, and claims priority from, British Application Number 1009219.5, filed Jun. 2, 2010, the disclosure of which is hereby incorporated by reference herein in its entirety.

The present invention is concerned with an aircraft component manufacturing method and apparatus. More particularly, the present invention is concerned with a manufacturing method utilising a robot arm to position a workpiece relative to a manufacturing system.

In aircraft component manufacture it is often desirable to perform operations on part-manufactured components. For example, a pressed component may be laser cut to remove excess material to provide the desired shape for use for a subsequent manufacturing operation or for assembly.

In order to undertake such manufacturing operations, the workpiece is mounted on a specialised jig. Such jigs have a pre-determined jig tool centre point (TCP). The jig TCP is aligned with a manufacturing system TCP. The term "manufacturing system" encompasses machine tools, etching tools, laser cutters, water jet cutters, painting devices and any other effector capable of performing a manufacturing operation. The manufacturing system can then carry out the desired operation with the workpiece in the correct position. The TCPs act as a datum, or reference point.

The jig is configured to match the profile of the workpiece and as such the workpiece must be installed in a particular orientation and position on the jig before machining. The jig is typically manufactured to form a mating fit with the workpiece.

A problem with the above method is that the jig must be individually manufactured for each part variant. Consequently, if a number of different workpieces need to be operated upon by the manufacturing system, then a number of individual jigs are required. This becomes particularly expensive, especially in the case of the aerospace industry in which part count and part variability are high. For example, many components of a modern aircraft may have a part count of one or two per aircraft.

A further problem with bespoke jigs is that there may be jig-workpiece alignment mismatch due to variability in the pressing manufacturing process used to form the workpiece, affecting location of the workpiece relative to the tool.

One alternative manufacturing method is disclosed in WO 2008/113783. A robotic arm is used to pick up a workpiece and its position measured. The arm then manipulates the workpiece relative to a stationary manufacturing effector in order to complete the required operation.

This approach exhibits several problems. The speed of the operation becomes dependent upon the nature of workpiece—for example a large heavy workpiece may not be as accurately or as quickly positioned as a small one. Therefore operational throughput will not be consistent which may detrimentally affect upstream an/or downstream operations. Also, because the robot arm needs to access a large range of positions (to pick up the workpiece from the storage area and deliver it to the machine), it may not be able to move the workpiece to the orientation required by a range of different effectors. This necessitates a highly complex robot arm in the prior art.

It is an aim of the present invention to overcome or at least mitigate one or more of the above problems.

According to a first aspect of the invention there is provided a method of manufacturing an engineering component comprising the steps of:
  providing a robot arm,
  providing a sensor,
  providing a manufacturing system having a movable end effector,
  providing a workpiece,
  attaching the workpiece to the robot arm,
  using the sensor to create position and/or orientation data indicative of the position and/or orientation of the workpiece,
  using the robot arm to position the workpiece at a desired position and/or orientation relative to the manufacturing system using the position and/or orientation data,
  holding the workpiece in a stationary position whilst using the manufacturing system to perform a manufacturing operation on the workpiece held by the robot arm by moving the movable end effector.

By utilising the robot arm to position the workpiece relative to the manufacturing system and hold it stationary during the manufacturing operation, the arm acts as a jig. The manufacturing operation can then take place without the use of a specialised jig—i.e. this is a jigless operation. Furthermore, because the exact workpiece location/orientation is measured and electronic control of the robot arm is used, no bespoke jig needs to be manufactured and the accuracy of positioning of the workpiece relative to the manufacturing system is improved.

Because the workpiece is held stationary during the manufacturing operation, the speed of the operation is not affected by the ability of the arm to move the workpiece during the operation.

Also, the manufacturing system effector can be mounted in a manner which best suits its path over the object. This negates the need for the robot arm to be capable of positioning the workpiece in a large number of positions relative to a stationary effector as in the prior art.

Further, existing jig-based manufacturing systems can be easily used with the invention, providing the tool centre point is known, and the workpiece is oriented in the position it would normally assume in such a jig.

Preferably the movable end effector is moved across the surface of the workpiece.

Preferably the method comprises the steps of:
  identifying the workpiece to create workpiece identity data,
  retrieving reference data specific to the workpiece from a database using the identity data,
  using the reference data to position the workpiece.

Preferably the method comprises the steps of:
  identifying the workpiece to create workpiece identity data, and,
  providing the manufacturing system with the identity data, such that the step of using the manufacturing system includes the step of performing a manufacturing operation dependent upon the identity data.

Preferably the step of identifying the workpiece includes the step of using the sensor to identify the workpiece using dimensional characteristics of the workpiece.

Alternatively, or additionally, the workpiece is provided with a tag comprising the identity data, and the step of identifying the workpiece includes the step of reading the tag. The tag may be visually readable (for example alphanumeric data or a bar code).

The manufacturing system may be a non-contact system such as a laser cutter or a line scanner. The method is well suited to such operations as the robot arm does not need to be designed to withstand the cutting forces of a mechanical operation.

According to a second aspect of the invention there is provided an engineering component manufacturing apparatus comprising:
a robot arm,
a sensor, and,
a manufacturing system comprising a movable end effector,
wherein the sensor is arranged to create data concerning the position of a workpiece attached to the robot arm, the robot arm is configured to orient a workpiece attached thereto relative to the manufacturing system using the data and hold the workpiece stationary whilst the manufacturing system performs a manufacturing operation on a workpiece attached to the robot arm by moving the movable end effector.

A method and apparatus for manufacturing an aircraft component according to the present invention will now be described by way of example and with reference to the following figures.

Figure 1B:
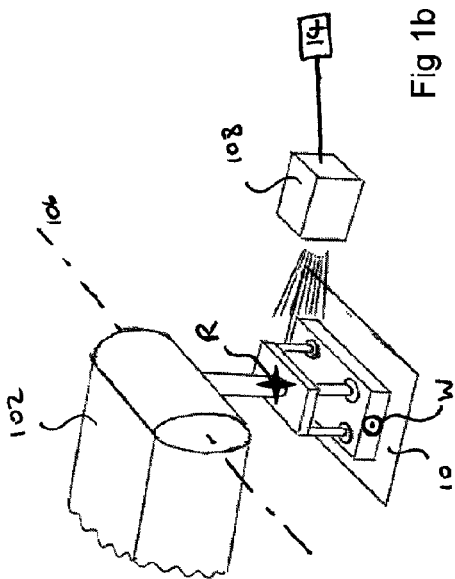
FIG. 1b is a perspective view of a second stage of the manufacturing operation in accordance with the present invention.
Figure 1D:
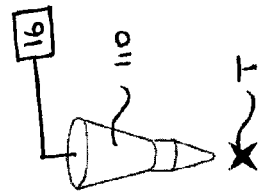
FIG. 1d is a perspective view of a fourth stage of the manufacturing operation in accordance with the present invention.
Figure 1A:
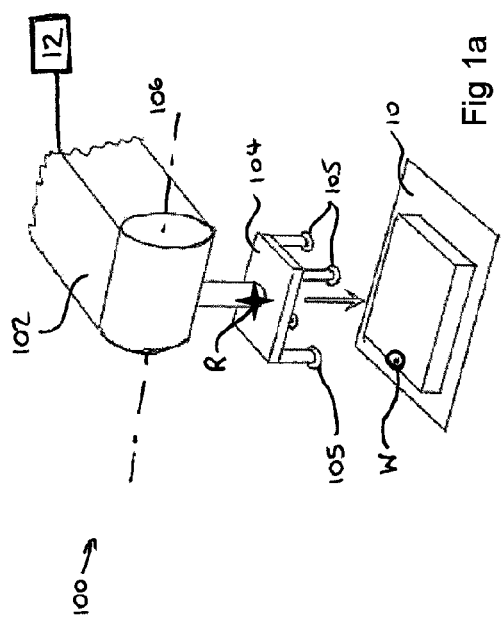
FIG. 1a is a perspective view of a first stage of the manufacturing operation in accordance with the present invention.
Figure 1C:
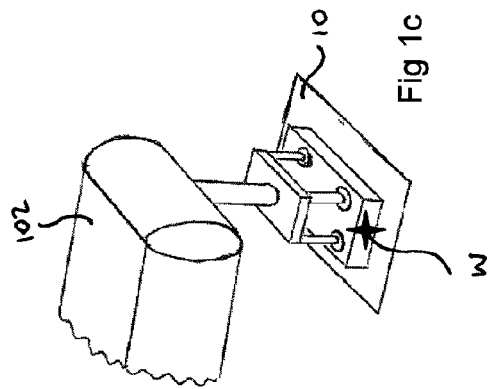
FIG. 1c is a perspective view of a third stage of the manufacturing operation in accordance with the present invention.

Referring to FIG. 1a, an apparatus 100 for the manufacture of an aircraft component 10 is provided.

The apparatus 100 comprises a robot arm 102 having a suction clamp 104 positioned in the end thereof. The robot arm 102 can be used to manipulate and move the suction clamp 104 in several degrees of freedom as is known in the art. The robot arm 102 is controlled by a computer 12. The suction clamp 104 can be rotated about a pivot axis 106. The suction clamp 104 comprises four suction cups 105 each of which can selectively adhere to the workpiece 10 (for example, using a vacuum pump).

The robot arm 102 has a notional, or initial TCP R which comprises a set of global coordinates. The software loaded onto the computer 12 which controls the robot arm 102 is configured to align the tool centre point R to a corresponding TCP of a manufacturing system in the form of a machine tool as will be described below.

The suction clamp 104 is used to adhere to the workpiece 10 which is picked up and moved by actuation of the robot arm 102 to the position shown in FIG. 1b. As shown in FIG. 1b the workpiece 10 is presented to a line scanner 108. The line scanner 108 is controlled by a computer 14. The computers 12, 14 are connected via a network. The computer 12 notifies the computer 14 that the workpiece 10 is ready to be scanned. The line scanner 108 scans the workpiece 10 in order to determine its orientation and position relative to the robot arm 102.

A user inputs the part number of the workpiece 10 into the computer 14 either manually or with e.g. a barcode scanner. A database of parts stored on the computer 14 provides a local tool centre point. The local tool centre point is the location of the TCP of the workpiece provided in local workpiece coordinates.

The computer 12 then uses the global coordinates of the workpiece 10 and the local TCP to calculate the workpiece tool centre point W (see FIG. 1b) in global coordinates. The TCP W is then communicated to the computer 12 across the network.

The robot arm tool centre point R is then adjusted by the computer 12 to match the workpiece TCP W.

Referring to FIG. 1d, a CNC laser cutter tool 110 is provided and is controlled by a computer 16, which is also networked to the computers 12, 14. The CNC laser cutting tool 110 has a tool centre point T. This is the point with which workpieces must be aligned in order for the manufacturing operation to be carried out correctly. The computer 16 is provided with the identity of the workpiece 10 by the computer 14 and an appropriate machining operation is selected.

Figure 1E:
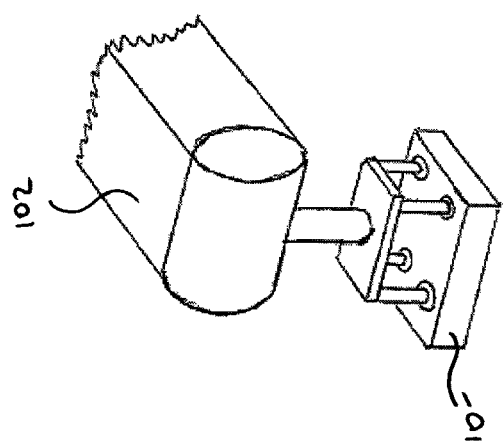
FIG. 1e is a perspective view of a fifth stage of the manufacturing operation in accordance with the present invention.

As shown in FIG. 1e, the co-located TCP of the robot and workpiece (R, W) is aligned to the tool TCP T by the robot arm 102 in order to start the operation in the correct place. The computer 12 notifies the computer 16 that the workpiece is in position. The tool then undertakes a manufacturing operation on the workpiece 10 under the control of the computer 16.

Figure 1F:
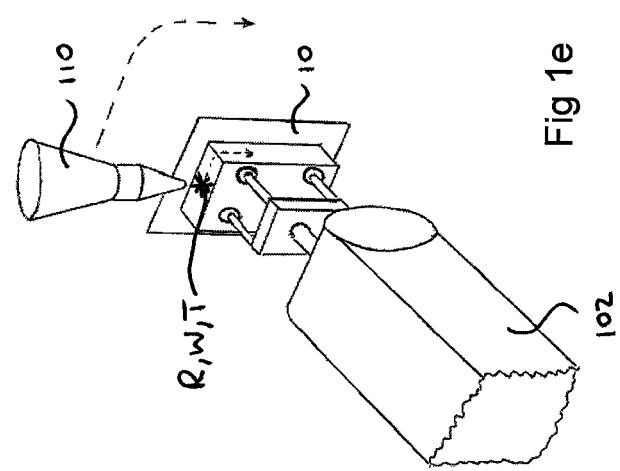
FIG. 1f is a perspective view of a sixth stage of the manufacturing operation in accordance with the present invention.

Finally, in the step shown in FIG. 1f, the robot arm 102 is used to move the manufactured workpiece 10' to a suitable storage area where the suction clamp 104 can be released.

Variations of the above embodiments fall within the scope of the present invention.

The scanner 108 may be located proximate the tool 110. A computer may determine the offset between the tool TCP and the workpiece TCP and control the robot arm 102 to position, or datum, the workpiece correctly to align the TCP W to TCP T.

Instead of recognising the workpiece 10 by shape, an identifier may be placed on the workpiece 10 such as a barcode or identifying mark which can be read either by the line scanner 108 or by another suitable scanner (such as a camera) in order to provide the identification data.

Instead of the user inputting the part number, the line scanner could be used to automatically identify a barcode on the workpiece 10, or even identify it by scanning its shape.

The computers 12, 14, 16 may be combined as one or more computers.

Different operations may be performed by the apparatus 100. For example, instead of a cutting head 110, a water jet or plasma cutter may be used. Alternative non-contact manufacturing operations may also be employed. For example painting, etching or any other type of low or non-contact manufacturing operation.

Instead of using a suction clamp 104, the robot arm 102 may pick up the workpiece 10 by use of physical clamp devices or electro-magnets.

The invention claimed is:
1. A method of manufacturing an engineering component comprising the steps of:
providing a robot arm having a robot arm tool centre point,
providing a sensor,
providing a manufacturing system having a movable end effector having an effector tool centre point,
providing a workpiece,
attaching the workpiece to the robot arm,
identifying the workpiece to create workpiece identity data,
retrieving a local workpiece tool centre point specific to the workpiece from a database using the identity data, using the sensor to create workpiece data indicative of global coordinates of the workpiece, calculating a global workpiece tool centre point using the global coordinates of the workpiece and the local workpiece tool centre point, whereby the global workpiece tool centre point is offset from the robot arm tool centre point, using the calculated global workpiece tool centre point as the robot arm tool centre point, determining a starting point by moving the robot arm to align the global workpiece tool centre point and the robot arm tool centre point to the effector tool centre point to start the operation in a correct place, and holding the workpiece in a stationary position whilst using the manufacturing system to perform a manufacturing operation on the workpiece held by the robot arm by moving the movable end effector from said starting point.

2. A method of manufacturing an engineering component according to claim 1 in which the movable end effector is moved across the surface of the workpiece.

3. A method of manufacturing an engineering component according to claim 1 comprising the steps of:
identifying the workpiece to create workpiece identity data,
retrieving reference data specific to the workpiece from a database using the identity data,
using the reference data to position the workpiece.

4. A method of manufacturing an engineering component according to claim 1 comprising the steps of:
identifying the workpiece to create workpiece identity data, and,
providing the manufacturing system with the identity data, such that the step of using the manufacturing system includes the step of performing a manufacturing operation dependent upon the identity data.

5. A method of manufacturing an engineering component according to claim 4 in which the step of identifying the workpiece includes the step of using the sensor to identify the workpiece using dimensional characteristics of the workpiece.

6. A method of manufacturing an engineering component according to claim 4 in which the workpiece is provided with a tag comprising the identity data, and the step of identifying the workpiece includes the step of reading the tag.

7. A method of manufacturing an engineering component according to claim 3 in which the step of identifying the workpiece includes the step of using the sensor to identify the workpiece using dimensional characteristics of the workpiece.

8. A method of manufacturing an engineering component according to claim 3 in which the workpiece is provided with a tag comprising the identity data, and the step of identifying the workpiece includes the step of reading the tag.

9. A method of manufacturing an engineering component according to claim 8 in which the tag is visually readable.

10. A method of manufacturing an engineering component according to claim 1 in which the manufacturing system is a non-contact system.

11. A method of manufacturing an engineering component according to claim 10 in which the manufacturing system is a laser cutter.

12. A method of manufacturing an engineering component according to claim 1 in which the sensor is a line scanner.

13. A method of manufacturing an engineering component according to claim 1, wherein the robot arm comprises suction cups for attachment of a workpiece.

14. An engineering component manufacturing apparatus comprising:
a computer,
a robot arm having a robot arm tool centre point,
a sensor, and,
a manufacturing system comprising a movable end effector having an effector tool centre point,
wherein the sensor is arranged to create workpiece data indicative of at least one of the position and the orientation of a workpiece attached to the robot arm, and
wherein the computer is configured to retrieve a local workpiece tool centre point specific to the workpiece, calculate a global workpiece tool centre point using the workpiece data and the local workpiece tool centre point, whereby the global workpiece tool centre point is offset from the robot arm tool centre point, adjust the robot arm tool centre point to be aligned to the global workpiece tool centre point, and to control the robot arm to position the adjusted robot arm tool centre point to be in alignment with the effector tool centre point to define a starting point and to hold the workpiece stationary whilst the manufacturing system performs a manufacturing operation on the workpiece attached to the robot arm by moving the movable end effector from said starting point.

15. An engineering component manufacturing apparatus according to claim 14, wherein the robot arm comprises suction cups for attachment of a workpiece.

* * * * *